Figure 3:
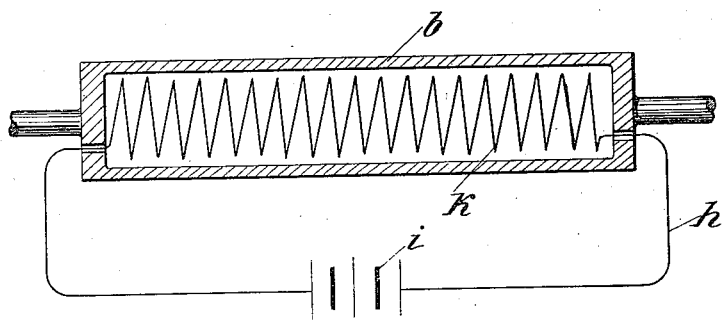

No. 708,309. Patented Sept. 2, 1902.
J. BRONN.
MANUFACTURE OF GLASS BY MEANS OF ELECTRICITY.
(Application filed Sept. 21, 1901.)
(No Model.) 2 Sheets—Sheet 1.
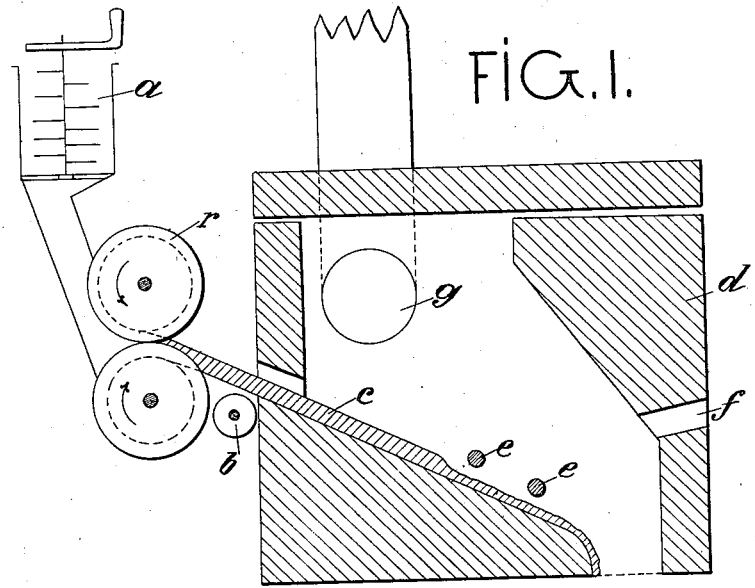
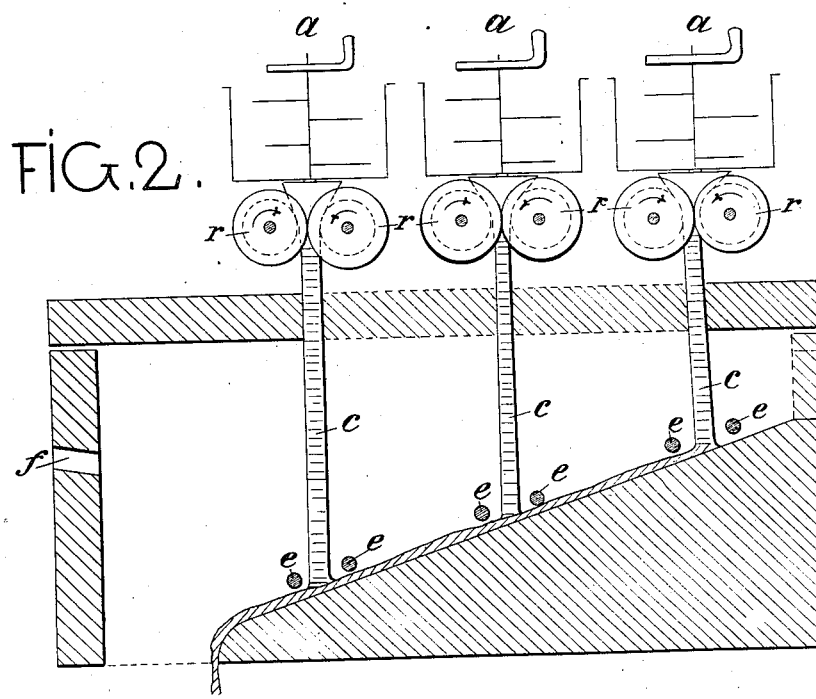

No. 708,309. Patented Sept. 2, 1902.
J. BRONN.
MANUFACTURE OF GLASS BY MEANS OF ELECTRICITY.
(Application filed Sept. 21, 1901.)

(No Model.) 2 Sheets—Sheet 2.

UNITED STATES PATENT OFFICE.

JEGOR BRONN, OF COLOGNE, GERMANY, ASSIGNOR TO GESELLSCHAFT ZUR VERWERTUNG DER PATENTE FÜR GLASERZEUGUNG AUF ELECTRISCHEM WEGE BECKER & CO., M. B. H., OF COLOGNE, GERMANY.

MANUFACTURE OF GLASS BY MEANS OF ELECTRICITY.

SPECIFICATION forming part of Letters Patent No. 708,309, dated September 2, 1902.

Application filed September 21, 1901. Serial No. 76,087. (No specimens.)

*To all whom it may concern:*

Be it known that I, JEGOR BRONN, a subject of the Emperor of Russia, residing at Cologne-on-the-Rhine, Kingdom of Prussia, and Empire of Germany, have invented certain new and useful Improvements in the Manufacture of Glass by Means of Electricity, of which the following is a specification.

In melting the raw materials used in the manufacture of glass by means of the electric arc difficulty is often experienced owing to the mixture, which consists of a powder or is made up of numerous small particles, becoming agglomerated by partial fusion before arriving at the electrodes, so that it is necessary to assist the passage of the mass by pushing it from time to time. The mixture therefore arrives intermittently or step by step underneath or between the electrodes, so that the latter, both as regards the thermic effect and as regards the mechanical wear by the friction of the raw material, are subject to varying stresses. Finally it may be mentioned that owing to the intermittent movement or feed of the mass considerably more carbon-dust is caused to fall from the carbons of the electrodes, so that the glass is correspondingly adulterated and must consequently be refined for a longer time.

It has been ascertained by a number of experiments conducted with the object of overcoming the before-mentioned disadvantages that the latter can be entirely avoided if the raw material is caused to pass under or between the electrodes in the form of compressed rods, balls, briquets, or the like, or, better still, in the form of a continuous rod. This end can, for example, be obtained by providing before or above the electric melting-furnace a device or apparatus in which the raw material may be kneaded and compressed before being caused to pass under or between the electrodes. In order to assist the operation, water or any binding agent—for example, water-glass—may be added to the raw material, or the calc-spar commonly used in melting glass may be either wholly or partially replaced by strongly-binding hydraulic lime, plaster, or such like. For the purpose of producing the continuous rod the raw material after being mixed with a suitable binding agent should preferably be caused to pass between rollers.

If it is desired to dry the rods, balls, briquets, continuous rod, &c., before entering the electric furnace, this can most easily be done by conducting the same over heated plates or rollers. For this purpose heat due to electrical resistance may be utilized.

Figure 4:
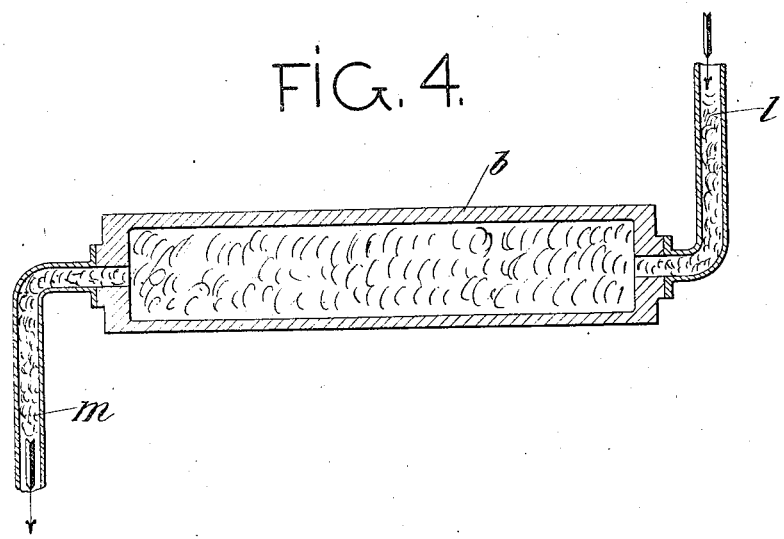

In the accompanying drawings, which illustrate diagrammatically an apparatus for carrying out the process, Figure 1 is a sectional side elevation of the furnace and apparatus for mixing and compressing the raw material. Fig. 2 is a sectional plan of the furnace and compressing apparatus. Figs. 3 and 4 represent details hereinafter referred to.

As shown by these drawings, $a$ represents the mixing and compressing apparatus for the raw material to be melted.

$d$ represents the furnace-body, and $f$ a view-aperture, and $g$ the outlet-shaft, respectively, provided therein.

$r$ represents several pairs of rollers which compress the raw material into a band or ribbon form and then feed it to the rollers $b$, which are heated by electrical resistance, as shown in Fig. 3, or by steam, as shown in Fig. 4, or in any other suitable manner.

$c$ represents the continuous rods or ribbons of raw material, which are conducted between or beneath the electrodes $e$ of the furnace $d$, so that they pass through the electric arcs.

By means of this apparatus the process may be easily carried out in such a manner that the variations of the electric current are reduced to a minimum and so that a contact of the molten material with the electrode when heated by the arc is entirely avoided, so that the glass obtained is purer in quality than heretofore.

The above-described apparatus may of course be replaced by any other one suitable for the purpose.

What I claim, and desire to secure by Letters Patent of the United States, is—

1. The process herein described of producing glass by electricity, which consists in mixing the raw materials together with water and a suitable binding agent, conducting the mixture in plastic form between compressing-rolls and thence, in a continuous moving strip in close proximity to electrodes by which it is subjected to melting heat from an electric arc, as explained.

2. A process for producing glass by means of electricity consisting in compressing the raw material, to which a suitable binding agent such as water, water-glass, hydraulic plaster or lime is added, into solid pieces and in then subjecting these pieces to the action of the electric current and melting the same, substantially as and for the purpose set forth.

3. A process for producing glass by means of electricity consisting in compressing the raw material to which a suitable binding agent such as water, water-glass, hydraulic plaster or lime is added into a continuous rod and in then subjecting this rod to the action of the electric current, and melting the same, substantially as and for the purpose set forth.

4. A process for producing glass by means of electricity consisting in compressing the raw material, to which a suitable binding agent such as water, water-glass, hydraulic plaster or lime is added into a solid form, then drying the same and finally melting it by means of the electric current, substantially as and for the purpose set forth.

5. A process for producing glass by means of electricity consisting in compressing the raw material, to which a suitable binding agent such as water, water-glass, hydraulic plaster or lime is added into a solid form, conducting said form over a heated surface, drying the same and in then melting said form by means of the electric current, substantially as and for the purpose set forth.

In testimony whereof I have hereunto set my hand in the presence of two witnesses.

JEGOR BRONN.

Witnesses:
CARL SCHMITT,
JOH. SCHOLZ.